Jan. 29, 1952  G. W. MARVIN  2,583,957
PISTON RING ASSEMBLY
Filed Feb. 25, 1949

INVENTOR,
George W. Marvin
BY
ATTORNEY.

Patented Jan. 29, 1952

2,583,957

UNITED STATES PATENT OFFICE 2,583,957

PISTON RING ASSEMBLY

George W. Marvin, Los Angeles, Calif., assignor of one-half to Standard Parts Co., Los Angeles, Calif.

Application February 25, 1949, Serial No. 78,264

3 Claims. (Cl. 309—44)

This invention relates to piston ring assembly, and more particularly to a spring carrier adapted to be yieldingly placed in the piston ring groove of a piston, and into which is placed a plurality of piston rings, said piston rings moving upon the cylinder wall, while the carrier is wholly within the piston ring groove of the piston.

In order to explain my invention, I have shown on the accompanying sheet of drawings one practical embodiment thereof, which I will now describe.

Figure 1:
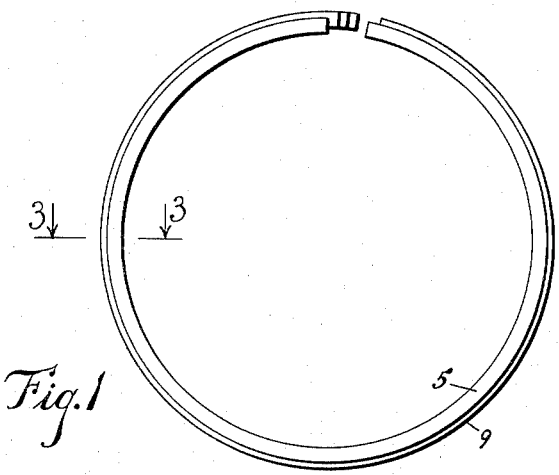
Figure 1 is a plan view looking down upon a piston ring assembly embodying my invention.
Figure 2:
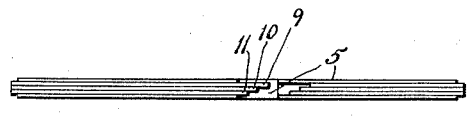
Figure 2 is an edge view, looking at the split ends thereof.

Referring to the drawings in detail, the piston is designated P, with piston ring groove G therein, and the cylinder wall is designated W, these parts all being old.

Figure 4:
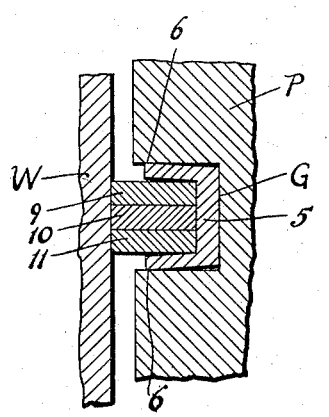
Figure 4 is a fragmentary, sectional view through a piston and cylinder wall, with a spring carrier and piston rings in place in operating positions.
Figure 3:
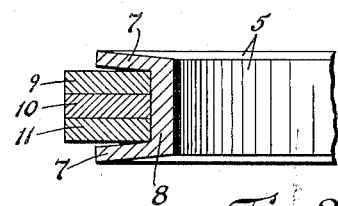
Figure 3 is a greatly enlarged, fragmentary sectional view through a piston ring carrier with three piston rings in place.

My invention includes a spring piston ring carrier, designated 5 and being in the form of a spring channel member opening outwardly, with its upper and lower wall members slightly flared, as indicated, so that when said channel carrier member is placed in the groove of a piston, said wall members will be compressed to the vertical diameter or measurement of said groove, as seen in Fig. 4, the outermost corners of said spring carrier bearing against the upper and lower walls of said groove, inwardly from its outermost edge, as at 6, 6. The walls of said carrier are designated 7, 7, and its base or connecting part is designated 8. It is made of spring metal and in substantially the form shown in section in the drawings, and is, of course, made as a split ring.

Mounted in this spring carrier are three piston rings, as 9, 10 and 11, having bearing engagement with the cylinder wall W, as seen in Fig. 4, in greatly enlarged form, whereby said piston rings effectively seal against passage of oil on said wall, as well as compression, and the bearing of the outer corners of said carrier 5, on the upper and lower walls of the groove G, at 6, 6, prevents oil from working into said groove and back of said piston rings and carrier.

In addition to effectively sealing the oil by reason of the construction and arrangement shown, this ring assembly is a real compression seal, and makes for increased efficiency in the performance of the motor after such a ring assembly has been installed, even on an old job where the piston grooves are worn. The assembly is particularly adapted for jobs where the grooves are worn and looseness is present in the old rings; and where a replacement job is required, this spring steel channel carrier, with its piston rings therein, is especially efficient because of the spring flaring walls of the carrier which fit yieldingly in the groove.

I do not, however, limit the invention to the details shown for explanatory purposes, knowing that the number of rings used in the carrier can be varied, as the job may require. Also that different kinds of piston rings can be used in the spring channel carrier, or oil saving rings, if desired, and so I do not limit the invention except as I may be limited by the hereto appended claims.

I claim:

1. A piston ring assembly including an annular spring ring channel member opening outwardly with its walls flaring slightly apart, and adapted to fit yieldingly into the groove of a piston, and a plurality of split spring piston rings in said channel member and projecting therefrom to engage a cylinder wall.

2. A piston ring assembly for use in the ring groove of a piston and comprising a steel U-shaped channel member of split ring form to fit yieldingly in said groove as a carrier, and a plurality of flat piston rings in said channel member and projecting therefrom to engage a cylinder wall for sealing purposes.

3. A spring channel member of split ring form opening outwardly with its top and bottom flaring apart to be flexed into a piston groove, and a plurality of flat spring piston rings held in said channel member and projecting therefrom to engage with a cylinder wall beyond said channel member.

GEORGE W. MARVIN.

REFERENCES CITED

The following references are of record in the file of this patent:

UNITED STATES PATENTS

| Number | Name | Date |
|---|---|---|
| 750,875 | Mathews | Feb. 2, 1904 |
| 1,014,782 | Smith | Jan. 16, 1912 |
| 1,595,855 | Clark | Aug. 10, 1926 |
| 1,755,673 | Solenberger | Apr. 22, 1930 |
| 1,781,207 | Wysong | Nov. 11, 1930 |
| 1,801,056 | Saks | Apr. 14, 1931 |
| 2,030,927 | Marien | Feb. 18, 1936 |

FOREIGN PATENTS

| Number | Country | Date |
|---|---|---|
| 667,847 | France | of 1929 |